UNITED STATES PATENT OFFICE.

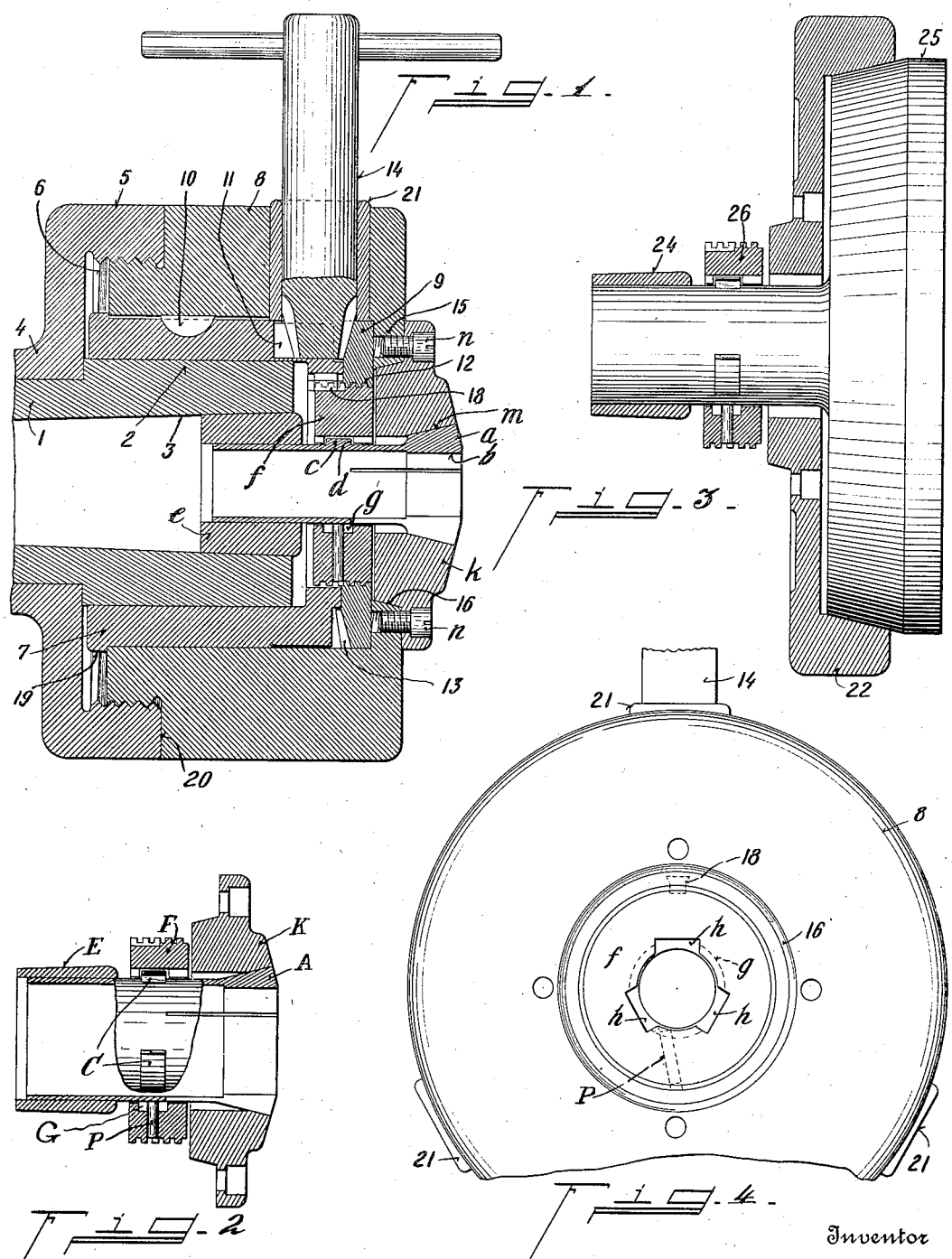

WILLIAM SCHELLENBACH, OF HARTWELL, OHIO.

COLLET-CHUCK.

1,094,346.

Specification of Letters Patent.

Patented Apr. 21, 1914.

Application filed January 8, 1913. Serial No. 740,801.

*To all whom it may concern:*

Be it known that I, WILLIAM SCHELLENBACH, a citizen of the United States, residing at Hartwell, in the county of Hamilton and State of Ohio, have invented certain new and useful Improvements in Improved Collet-Chucks, of which the following is a specification.

This invention relates to improvements in chucks, and it is concerned more especially with the creation of a new order of chucks adapted to clamp work through the agency of a collet.

One of the objects within the contemplation of this invention is to render available a collet chuck of a compact and self-contained nature, capable of being mounted on the projecting end of a spindle and of being operative entirely from that end, so as to avoid the necessity of having a draw sleeve pass through the spindle or of having the chuck operating means located at the gear end of the spindle.

Another object is to render available a collet chuck satisfying all requirements of accuracy, in which the collets may be positively drawn in or pushed out to clamp or unclamp the work, as the case may be, and thus overcome the difficulty sometimes arising in the case of an ordinary chuck construction in which the collets occasionally tend to stick and give rise to some trouble in unclamping the work.

Another object is to create a collet clutch organization such that clutches of different sizes throughout a wide range or step chucks equally ranged, may be interchangeably available without impairing the accuracy of the device or causing undue trouble in making the necessary interchanges.

Another object is to devise a chuck construction in which collets may be very quickly inserted or withdrawn and in which the apparatus may be operated very easily by means of an ordinary key wrench.

Other objects will be in part apparent from the accompanying drawings, and in part pointed out in the following description thereof.

In order that this invention may be made more readily comprehensible to those skilled in this art, drawings exemplifying the principles of construction thereof have been appended as a part of this disclosure, and in such drawings, like characters of reference denote corresponding parts throughout all the figures, of which:—

Figure 1 is an axial section showing in assembled form the features of one arrangement, illustrating the application of the invention to accommodate a small-sized collet. Fig. 2 illustrates partly in axial section and partly in side elevation the elements interchangeably applicable to the head shown in Fig. 1, whereby the chuck is enabled to accommodate larger sized collets. Fig. 3 is a view similar to Fig. 2, showing the elements interchangeably available in case it is desired to use a spring disk step chuck instead of a collet in the head shown by Fig. 1. Fig. 4 is a front elevation of the head shown by Fig. 1, with thimble and collet removed.

Continuing now by way of a more detailed description, it is to be noted that this chuck is applicable to the projecting end or nose of a spindle of any conventional or special type of construction. For example, in Fig. 1, the spindle consists of a sleeve 1, terminating in an enlarged end 2 having a slightly tapering bore 3 and surmounting this sleeve 1 is a second member 4 that is in abutment with the enlarged end 2 and provides an overhanging flange 5 interiorly screw-threaded, as indicated by 6. While the head is in this instance designed preferably for use in connection with a spindle thus constructed, it is to be understood that it may be adapted for other types of spindles.

The chuck head is preferably of a two-part construction comprising an annular member 7 having a snug fit with the nose 2 of the spindle, and also comprising a cap-like member 8 that telescopes the spindle member 7 and incloses an actuating screw ring or annulus 9, as will be more particularly specified. The annular member 7 in this instance terminates in an end-flange having a smooth bore provided with a spline key 10 preferably permanently secured in place, and at intervals the member 7 preferably provides radial sockets for the reception of a gear or key wrench.

Arranged at the end of the member 7 is an annulus 9 having its bore provided with the screw-threads 12 and having its side provided with the beveled gear 13, whereby it is actuated by means of a key wrench 14 having its end correspondingly toothed, and adapted to be inserted into the aforesaid socket. For the purpose of inclosing the annulus 9 and at the same time drawing the member 7 onto the spindle nose, the member 8 provides an annular flange 15 that encompasses the side of the annulus 9, and this flange 15 terminates in a conical face 16, which is in exact concentricity with the axis of the spindle, so as to provide an exact centering face for the detachable thimble to be subsequently described. The member 8 is also translatably, but non-rotatably mounted on the member 7 by means of the spline 10 and a fixed key 10, see Fig. 1, and its position on the member 7 is determined by the flange 19, which abuts the end of the member 8 when the latter is drawn on by means of the threads 6, until its side face 20 abuts the end of the flange 5. The member 8 is also provided with apertures in radial registry with the sockets 11, which apertures are preferably provided with hardened bushings 21.

The construction thus far described constitutes a self-contained operative organization that is attachable to a live spindle, and by means of the elements next to be described, is capable of receiving various sizes of collets or spring disks throughout a wide range. The parts adapting this head for a smaller sized collet are shown in assembled relation by Fig. 1, and may next be described. These smaller collets are indicated by $a$, and throughout their different sizes their proportions will be constant, save for the gripping surfaces $b$, that of course will vary in diameter throughout the range to which the smaller sized collets are applicable. While the shank of this collet may be provided with screw threads following the ordinary construction, it preferably dispenses with such threads and in lieu thereof, provides a peripheral series of lugs $c$ that are integral with the shank of the collet, and which preferably have their front edge faces $d$ all in the same radial plane. The inner end of the shank is accurately held in concentric relation with the bore of the spindle by means of a bushing $e$, that is detachable in case collets of another series are to be used. This bushing is held in place by its driving fit within the slightly tapered bore 3 of the spindle, as will be understood. In case the ordinary screw threads are dispensed with, as before described, this invention proposes a collet actuating member in intervening relation between the collet and the annulus 9 and to accommodate shanks of different sizes for the different series of collets, this member, indicated on Fig. 1 by $f$, is detachable from the head and is interchangeable with others. To that end, the outer periphery of this actuating ring $f$ is screw threaded, so that it may be secured into and through the bore of the annulus 9 and its periphery provides a seat adapted to receive the spline key 18, so that this ring-like member $f$ may be translated within the head by rotating the annulus 9, but the member $f$ may not be rotated by reason of the spline key 18. The bore of the member $f$ provides an annular groove $g$ adapted to receive the lugs $c$, and to enable them to be freely inserted, it provides axial passage ways $h$ opening at intervals into such annular grooves. By this arrangement, which is in the nature of a bayonet joint connection, the collets may be quickly engaged with the ring $f$ and thereupon by turning the annulus 9 they may be translated against the closure piece to grip the work, or conversely, they may be shifted positively into open position. The closure member or thimble is indicated by $k$ and has a closure seat $m$ adapted to coöperate with the conical periphery of the head of the collet $a$ and this thimble is detachably secured to the head by means of screws $n$ taken into the member 8 and drawing the member $k$ tightly into position until its position is determined with concentric accuracy by means of the conical face of the member 8.

Should it be desired to use a series of collets having a range beyond those described in the foregoing, the parts shown by Fig. 2 are interchangeably available with those described in the foregoing. Thus, the parts A, E, F, and K are constructed in a manner analogous to the parts $a$, $e$, $f$, and $k$, but are proportioned differently in respect to providing for the reception of larger diameter material. The outer peripheries of parts E, F, and K are however similar to the parts $e$, $f$, and $k$ from the standpoint of dimensions, so that they may be accurately interchangeable in the head. The connection between the bore of the screw ring F and the shank of the collet A is also preferably in the nature of a bayonet joint and the groove G is preferably provided with one or more stops or bridges P to determine the proper engaging position of the collet A within the screw ring F. The shank of the collet can thus be inserted through the collet aperture and into the bore of the annulus, bringing the lug C within the groove G, whereupon a slight turn of the collet will affix it to the annulus so as to be translated therewith, and inasmuch as the pins P penetrate they will engage the ends of lugs C and limit the rotation of the collet in the annulus, whereby the collet will be rotated with the head.

Fig. 3 represents a view similar to Fig. 2 and shows the parts that are interchangeable in the head for the purpose of adapting the chuck for the reception of a spring disk or step-chuck. In that case a chuck closer 22 is used in place of a collet thimble, but is attached to the head in a similar manner by screws $n$. A suitably diametered bushing 24 is used to adapt the shank of the spring disk 25 to the bore of the spindle and a suitably proportioned screw ring 26, analogous to the ring $f$, F, is also used.

It will thus be seen that this invention is well adapted to achieve the objects and advantages apparent from the foregoing and by means of a comparatively simple construction admitting of accuracy and precision in all particulars. By this arrangement it is unnecessary to provide collet operating means at the other end of the spindle and by this arrangement the parts are applied to the nose of the spindle in a very compact manner reducing the overhang to a minimum, and at the same time enabling the operator to apply considerable force both in gripping as well as in releasing the collets.

I therefore claim as my invention and desire to secure by Letters Patent of the United States:—

1. An apertured collet head, an interior concentric annulus therein to be translated, a rotatable ring within the head aperture for operating said annulus, means for operating said ring through the head, means in said head providing a collet closure surface concentric with the annulus, and a collet having its inner end detachably fixed to the annulus and its outer end operative in relation to said closure surface.

2. A structure of the nature disclosed combining a spindle, a head thereon providing an aperture concentric therewith and terminating in a flaring closure seat, an annulus translatably mounted within said head, a collet in said aperture having its shank detachably retained in the bore of said annulus, and means for positively adjusting said annulus axially to engage or disengage the head of said collet with said seat.

3. A structure of the nature disclosed combining a head providing an aperture terminating in a flaring closure seat, an annulus translatably mounted in said head concentrically with said aperture, a collet in said aperture having a bayonet-joint connection with the bore of said annulus, and means for positively adjusting said annulus axially.

4. A structure of the nature disclosed combining a head providing an aperture, a cap-member on said head and apertured concentrically therewith, an annulus rotatably retained between said head and cap-member, a translatable annulus operatively connected with said rotatable annulus and adapted to be axially adjusted thereby, and a collet in said aperture having a detachable connection with the bore of said translatable annulus.

5. A structure of the nature disclosed combining a head having a collet-aperture and adapted to be attached to a spindle, a collet, an annulus rotatably inclosed in concentric relation with said head intermediate the ends thereof and provided with bevel gear-teeth enabling it to be rotated, said head having a radial aperture affording access to said gear-teeth, and means whereby said annulus when rotated may be instrumental in positively translating a collet in said collet-aperture.

6. A structure of the nature disclosed combining a head adapted to be attached to a spindle, a collet, an annulus rotatably mounted in concentric relation with said head, a cap-member secured to said head to confine said annulus and providing a collet-aperture, and means whereby said annulus when rotated may be instrumental in positively translating a collet in said collet-aperture.

7. A structure of the nature disclosed combining a two-part head, the one part attachable to a spindle, and the other part having a collet-aperture, a collet, an annulus rotatably inclosed by said two parts intermediate the ends of said head and provided with a bevel-gear enabling it to be rotated, said head providing an aperture radiating from said bevel-gear enabling an operating wrench to be engaged therewith, and means whereby said annulus when rotated may be instrumental in positively translating a collet in said collet-aperture.

8. A structure of the nature disclosed combining a head having a collet-aperture and adapted to be attached to a spindle, a collet, an annulus rotatably inclosed in concentric relation with said head intermediate the ends thereof and provided with bevel gear-teeth enabling it to be rotated, said head having a radial aperture affording access to said gear-teeth, an annular member detachably secured to said head and provided with a collet closure surface, and means whereby said annulus when rotated may be instrumental in positively translating a collet in said collet-aperture.

9. A structure of the nature disclosed combining a head-member adapted to be attached to a spindle, a collet, an annulus rotatably mounted in concentric relation with said head-member, a cap-member secured to said head-member to confine said annulus, an annular part detachably secured on said cap-member and providing a collet-closure surface, and means whereby said annulus when rotated may be instrumental in positively translating a collet in said collet-aperture.

10. A structure of the nature disclosed combining a two-part head, the one part attachable to a spindle, and the other part having a collet-aperture, a collet, an annulus rotatably inclosed by said two parts intermediate the ends of said head and provided with a bevel gear enabling it to be rotated, said head providing an aperture radiating from said bevel gear enabling an operating wrench to be engaged therewith, an annular member detachably secured to said other head-part and providing a collet closure surface, and means whereby said annulus when rotated may be instrumental in positively translating a collet in said collet-aperture.

11. A structure of the nature disclosed combining a spindle, a head thereon providing an aperture concentric therewith and terminating in a flaring closure seat, an annulus translatably mounted within said member, a collet in said aperture having its shank detachably retained in the bore of said annulus so as to be translated therewith and rotate with the head, a member rotatably telescoping said annulus and adjustably connected therewith, and means for rotating said member positively to adjust said annulus axially to engage or disengage the head of said collet with said seat.

12. A structure of the nature disclosed combining a head providing an aperture terminating in a flaring closure seat, an annulus translatably mounted in said head concentrically with said aperture, a collet in said aperture having a bayonet-joint connection with the bore of said annulus, and a member rotatably mounted in said head for positively adjusting said annulus axially.

13. A structure of the nature disclosed combining a head providing an aperture, a cap-member on said head and apertured concentrically therewith, an annulus rotatably retained between said head and cap-member, a translatable annulus screw threaded into the bore of said rotatable annulus and adapted to be axially adjusted thereby, and a collet in said aperture having a bayonet joint connection with the bore of said translatable annulus.

14. A collet head, an annulus to be translated interiorly thereof, a collet having a shank extending inwardly into the head and detachably secured within the annulus bore so as to be rotated with the head and translated with the annulus, and means operative through the head for actuating the annulus.

15. A collet head having an aperture providing a collet closure surface, a concentric annulus in the head, right and left hand bevel gears in the head for translating said annulus concentrically to said aperture, and a collet having its shank engaging within the annulus bore enabling the collet to be translated with the annulus and rotated with the head.

16. A collet head apertured to interiorly contain collet operating parts, an apertured member detachably secured to the head closing the outer end of said aperture and providing a collet closure surface, an annulus within the head concentric with said member aperture, a collet having its inner end detachably fixed within said annulus, and its outer end operative in relation to said closure surface, a ring in said head aperture for translating said ring through the head, said arrangement enabling different sizes of collets to be interchangeably assembled within said head.

17. An apertured collet head, means partially closing the outer end of the aperture and providing a collet closure surface, an annulus to be translated within said head aperture, a collet engaging said closure surface, having a shank inwardly projecting through said means and detachably secured within the annulus bore, and means within said aperture adapted to be operated through said head to actuate said annulus.

18. A device of the nature disclosed comprising a collet head formed with an interior chamber having a reduced outlet at one end providing a collet closure surface, means for attaching said head to a spindle concentrically relative to said outlet, a concentric annulus translatably supported in said head chamber adjacent said outlet, means in said chamber adapted to be operated through the head to translate said annulus, and a collet having a shank, said shank and the inner periphery of the annulus being formed to permit of the insertion of the shank through said head orifice, and to be detachably connected within said annulus bore so as to be translated therewith and to be rotated with the head.

In testimony whereof, I have hereunto set my hand.

WILLIAM SCHELLENBACH.

Witnesses:
 CLARENCE B. FOSTER,
 OLIVER B. KAISER.